Patented May 3, 1938

2,116,355

UNITED STATES PATENT OFFICE 2,116,355

DISAZO DYESTUFFS AND THEIR PRODUCTION

Georges Kopp, Rouen, France, assignor to Compagnie Nationale de Matières Colorantes et Manufactures de Produits Chimiques du Nord Réunies, Etablissements Kuhlmann, Paris, France, a corporation of France No Drawing. Application March 26, 1936, Serial No. 71,050. In France April 2, 1935

8 Claims. (Cl. 260—78)

It has been found in accordance with the present invention that azodyestuffs of great value for dyeing and printing of animal textile fibres are obtained by coupling tetrazo derivatives of bases of the general formula:

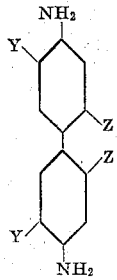

in which Y represents a member of the group consisting of alkoxy, alkyl, and halogen radicles and Z represents sulphonic groups, with arylides of acetylacetic acid of the general formula:

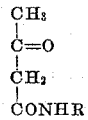

in which R is an aryl radicle.

These dyestuffs dye animal fibres in very bright yellow shades and their dyeings on wool for example are remarkably fast to milling. The intensity and the brightness of these dyestuffs are unexpected, the corresponding dyestuffs derived from benzidine di-sulphonic acid being on the contrary very dull and having no practical interest.

The coupling of the azodyestuffs of the present invention is difficult to be made; the products obtained without precautions are of reddish shades and their dyeings change rapidly to greenish yellow under the action of light. It is undoubtedly by reason of this difficulty that the new dyestuffs of the present invention have not been disclosed previously.

These products are of the greater value since the range of acid dyestuffs fast to fulling only comprised hitherto a very small number of bright greenish yellow dyestuffs. Their resistance to fulling is moreover much superior to that of the dyestuffs of the trade such as those derived from benzidine di-sulphonic acid and phenyl-methyl pyrazolone.

The following examples illustrate the invention without limiting the same thereto:

Example 1

22 parts of dianisidine di-sulphonic acid (produced by sulphonation of dianisidine) are diazotized in the customary manner. The diazo solution is considerably diluted, for example by the addition of 2,000 parts of ice and water, the temperature being in the neighborhood of 0° C. This diazo solution is caused to flow drop by drop into a coupling bath containing 18 parts of pure acetylacetic anilide, 10 parts of caustic soda of 35° Bé. and 24 parts of anhydrous sodium carbonate in solution in 500 parts of ice water at 0° C. This coupling bath is stirred very energetically in order to mix the diazo solution instantaneously with the coupling component. At the time of the end of the coupling, the coupling mass is acidified in order to withdraw the dyestuff from the action of the carbonate. After filtration and drying the product is obtained in the form of a yellow powder. This dyestuff dyes wool a very bright greenish yellow remarkably fast to fulling.

Example 2

There is prepared in the customary manner a diazo solution from 20.5 parts of tolidine di-sulphonic acid in 2,000 parts of ice water at 0° C. This solution is caused to flow drop by drop into an energetically stirred coupling bath containing 21 parts of acetylacetic orthochloranilide, 10 parts of caustic soda and 30 parts of crystallized sodium acetate. Immediately at the end of the coupling the whole is heated to the perfect crystallization of the dyestuff, whereupon the latter is filtered and dried. The dyestuff thus prepared is ground with 5% of its weight of anhydrous sodium carbonate. It dyes animal fibres a greenish yellow of very good fastness properties.

Example 3

The acetylacetic anilide of Example 1 is replaced by an equivalent quantity of acetylacetic-m-xylidide. The dyestuff thus obtained dyes animal fibres a bright yellow which is a little more reddish than the dyestuff of Example 1.

Example 4

A dye bath is prepared with 1,000 parts of water at 50° C. 1 part of the dyestuff of Example 1, 2 parts of formic acid and 2 parts of sodium sulphate. 50 grams of wool are introduced and the whole is heated gently to boiling. After heating for half an hour at the boiling point the bath is completely exhausted. The wool is dyed in a very level intense greenish yellow. The fastness properties, in particular the resistance to fulling, are excellent.

What I claim is:

1. Process for the manufacture of disazo dyestuffs consisting in coupling the tetrazo derivatives of bases of the general formula:

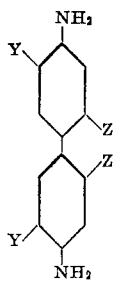

in which Y represents a member of the group consisting of alkoxy, alkyl, and halogen radicals, and Z represents sulphonic groups, with arylides of acetyl acetic of the general formula:

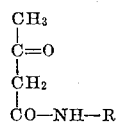

in which R is an aryl radical.

2. Process for the manufacture of disazo dyestuffs consisting in coupling the tetrazo derivatives of bases of the general formula:

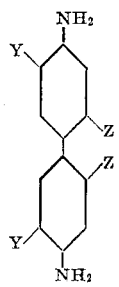

in which Y represents an alkoxy radical and Z represents sulphonic groups, with arylides of acetyl acetic of the general formula:

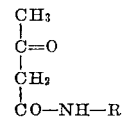

in which R is an aryl radical.

3. Process for the manufacture of disazo dyestuffs consisting in coupling the tetrazo derivatives of bases of the general formula:

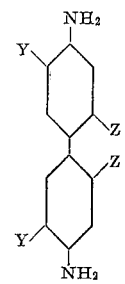

in which Y represents an alkyl radical and Z represents sulphonic groups, with arylides of acetyl acetic of the general formula:

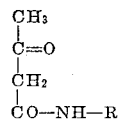

in which R is an aryl radical.

4. Process for the manufacture of disazo dyestuffs consisting in coupling the tetrazo derivatives of bases of the general formula:

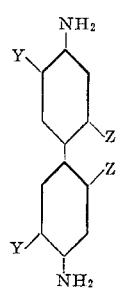

in which Y represents a halogen radical and Z represents sulphonic groups, with arylides of acetyl acetic of the general formula:

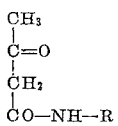

in which R is an aryl radical.

5. The disazo dyestuffs of the following formula:

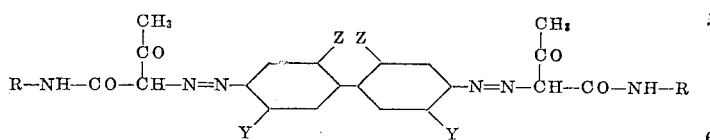

in which Y represents a member of the group consisting of alkoxy, alkyl, and halogen radicals, Z represents a sulphonic acid group and R an aryl radical.

6. The disazo dyestuffs of the following formula:

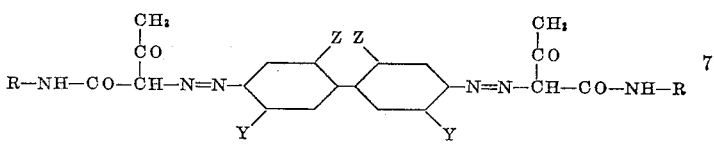

in which Y represents an alkoxy radical, Z represents a sulphonic acid group and R an aryl radical.
7. The disazo dyestuffs of the following formula:
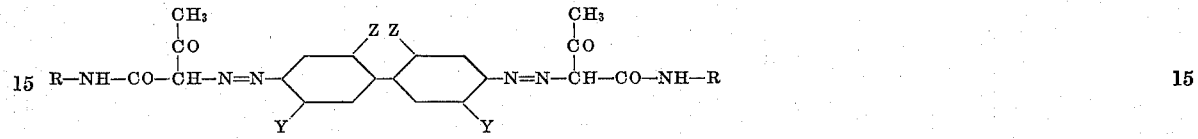
in which Y represents an alkyl acid, Z represents a sulphonic acid group and R an aryl radical.
8. The disazo dyestuffs of the following formula:
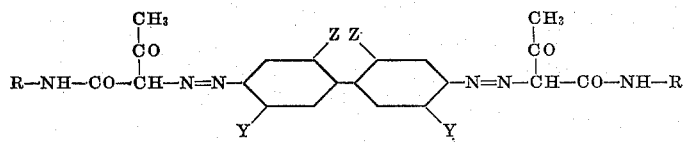
in which Y represents a halogen radical, Z represents a sulphonic acid group and R an aryl radical.
GEORGES KOPP.